3,108,997
MORPHOLINO LOWER ALKANOYL XYLIDIDES AND TOLUIDIDES

Johan Richard Dahlbom, Sodertalje, Nils Magnus Löfgren, Lidingo, Claes Philip Tegner and Sigfrid Esaias Sten Wiedling, Sodertalje, Sweden, and Aldo Peter Truant, Worcester, Mass., assignors to Aktiebolaget Astra, Apotekarnes Kemiska Fabriker, Sodertalje, Sweden, a company of Sweden
No Drawing. Filed Oct. 28, 1958, Ser. No. 769,997
Claims priority, application Sweden Oct. 31, 1957
5 Claims. (Cl. 260—247.1)

This invention is that of certain new morpholinoacyl toluidides, xylidides and mesidides (general reference hereinbelow to toluidides and mesidides only is meant to include xylidide) and the physiologically innocuous acid salts of these amides, which amides have the formula

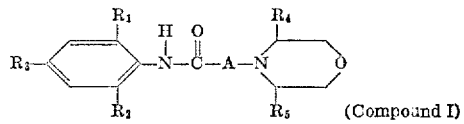

(Compound I)

wherein $R_1$ is methyl or ethyl; each of $R_2$ and $R_3$ is separately and independently hydrogen or methyl; $R_4$ is hydrogen, methyl, ethyl, methoxy, ethoxy, or phenyl; $R_5$ is hydrogen, methyl or methoxy; and A is the divalent phenylmethylene group i.e.,

or a straight or branched chain divalent alkylene group having from two through six carbon atoms and in which one of the hydrogens can be replaced by the phenyl group.

The physiologically innocuous acid addition salts of these morpholinoacyl toluidides, xylidides and mesidides of the invention are, for example, those of a mineral acid, such as a hydrohalide as the hydrochloride or the hydrobromide, the phosphate, nitrate, or sulfate; or of an aliphatic acid such as a mono-, di-, or tri-carboxylic acid, as the acetate, ascorbate, citrate, fumarate, glycolate, lactate, levulinate, maleate, oxalate, succinate, or tartrate; or of an aliphatic sulfonic acid, as the methane-sulfonate and ethane-disulfonate; or of a heterocyclic acid, as the nicotinate.

These new morpholinoacylamides, as well as their physiologically innocuous salts, manifest valuable medicinal properties exhibited in their effect on the central nervous system, for example, in influencing the autonomic and motor activity through the higher centers of the brain and the cord, as by a decrease in locomotion, reduction in reflex activity and in consciousness usually associated with sedation and in producing a transquilizing effect. These amides and their physiologically innocuous salts show a valuably high therapeutic index (as seen from their potent sedative effect contrasted with their remarkably low toxicity).

In addition, the new amide compounds of the invention and their physiologically innocuous salts serve to potentiate and enhance the therapeutic activtiy of other therapeutic agents, for example, general sedative, hypnotic, and soporific substances such as the barbiturates (which term is used broadly here as including also the thiobarbiturates as well as the alkali metal, e.g. sodium, salts of both types) as pentobarbital, hexabarbital, vinbarbital, secobarbital, and thiopental, and ethyl alcohol, and general anesthetics such as ether, chloroform, cyclopropane, and nitrous oxide, and analgesics, for example, allyl salicylamide, methadone hydrochloride, meperidine hydrochloride, and others of these various types of agents.

The invention embraces preparation of these new amides by condensing together a compound of the general formula

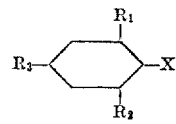

(briefly called "intermediate II") with a compound of the general formula Y—Z (briefly called "intermediate III"); wherein $R_1$, $R_2$, and $R_3$ are defined the same as recited above; Z is a morpholino group or a group that can be converted to a morpholino group, for example, by combining with another reactant as indicated hereinbelow; and each of X and Y is a separate reactive radical or group respectively of the type that can react with each other of them to condense together to form an acylamido bridge, i.e.

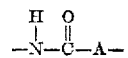

and thereby to produce a compound I.

Where, for example, X is the primary amino group and Y is a halide radical such as chloro or bromo, so that a hydrohalide such as hydrobromic acid or hydrochloric acid is released as a product of a condensation between an intermediate II and an intermediate III, an acid addition salt of the compound I can form in the reaction mixture, such as the hydrobromide of the amide compound I. In any event, where the main product isolated from the reaction of intermediates II and III is the free amide, the latter, if desired, then readily is converted to the desired physiologically innocuous acid addition salt of it, for example, as described at columns 6 and 8 below.

The foregoing preparation of a compound I can be carried out, for example, by condensing a substituted phenylamine of the formula of intermediate II, or an acid addition salt thereof, with a halogeno-aliphatic carboxylic acid, or with a reactive derivative of such acid (i.e. involving its carboxylic group), such as a halide (e.g. a chloride), ester, or amide.

In carrying out that condensation, it may sometimes be advantageous to include a condensing agent that enhances the release of a hydrohalide, for example, phosphorous pentoxide, an alkali metal as sodium, an alkali metal amide as sodamide, or an alkali metal alcoholate as $NaOC_2H_5$; or to use a Grignard reaction. The substituted halogenoacyl anilide thus formed then is reacted directly either (i) with morpholine or morpholine substituted as in the description of compound I, whereby a substance of the general type of compound I is formed, or (ii), in the case of the preparation of unsubstituted and some substituted morpholino compounds, with ammonia or an amine, such as a primary amine, or mono- or di-ethanolamine, and then converting the thus formed aminoacylamide compound into the corresponding morpholino compound I, in known manner. For example, if the resulting amide compound has a free amine linked to the divalent alkylene group A, it can be reacted with two moles of ethylene oxide per mole of that aminoacylamide to obtain the di-ethanolaminoacylamide, and then converting the di-ethanolamino group to the morpholino group by ring closure by condensation of H·OH jointly from the hydroxyls of the two ethanol groups under the influence of a compatible dehydrating agent.

The resulting morpholinoacyl toluidide or mesidide then can be converted into any desired physiologically innocuous acid addition salt of it as described herein.

It is also possible to prepare the compounds of the invention by condensing a suitably substituted phenylamine of the formula of intermediate II with an aliphatic carboxylic acid having one of its alkyl hydrogens replaced by a suitable morpholino group (i.e. from morpholine alone or substituted as indicated for it in the formula of compound I), or by a group which can be converted to the desired morpholino group in known manner, as indicated just above, to yield the desired compound I.

Instead of the particular morpholino-substituted aliphatic carboxylic acid there may be used a reactive derivative of such acid (i.e. involving its carboxylic group), such as a halide (e.g. a bromide), ester, or anhydride of it, and, if necessary, including a condensing agent (of the type disclosed above), or otherwise using Grignard synthesis. In other words, such reactive derivative is one which will condense with a primary or secondary amine to form an amide.

It is also possible to react a phenylamine of the formula of intermediate II with an alkenyl carboxylic acid or a reactive derivative thereof (i.e. involving its carboxylic acid group) of the type shown above. The resulting alkenoyl toluidide or mesidide is condensed directly with morpholine, or morpholine substituted on its carbons as in compound I, whereby a compound I is formed. Alternatively, such alkenoyl toluidide or mesidide is condensed with ammonia or an amine (as in column 2 above), whereby a corresponding aminoacyl toluidide or mesidide is formed and thereafter converted to the corresponding morpholinoacyl toluidide or mesidide in known manner as referred to above.

The acylamides of the invention also can be prepared by condensing a reactive substituted phenylamine of the formula of intermediate II, such as its phosphazo-compound, with a morpholino-alkyl carboxylic acid (and wherein the morpholino group can be substituted as shown for it in compound I), whereby a compound I is formed directly. Alternatively, the phosphazo compound of the substituted phenylamine can be condensed with an alkyl carboxylic acid substituted on its alkyl chain by a group, for example, as shown by column 2 above, which can be converted to a morpholino group, whereby a corresponding aminoacyl toluidide or mesidide is formed and thereafter converted to the corresponding compound I in known manner as indicated hereinabove.

The compounds, as well as the methods, of the invention are illustrated by, but not restricted to, the following examples:

EXAMPLE 1

*Alpha-Morpholinopropionyl-Ortho-Toluidide*

One mole of ortho-toluidine is dissolved in 800 milliliters of acetic acid. The mixture is cooled to 10° C., after which 1.1 moles of alpha-bromo-propionyl bromide is added. The mixture is stirred vigorously for a few moments, whereupon a sodium acetate solution (330 grams of $CH_3COONa \cdot 3H_2O$ in 1380 ml. of water) is added at one time. The reaction mixture then is shaken for half an hour, after which the precipitate formed is filtered off, washed with water and dried. The product alpha-bromopropionyl toluidide is sufficiently pure for further synthesis. The yield amounts to 70–80% of theoretical. M.P. 133–134° C. (In place of the sodium acetate, some other buffering agent such as sodium citrate or disodium phosphate or other alkalinizing substance or solution can be used.)

One mole of alpha-bromopropionyltoluidide thus obtained is heated in a pressure bottle with 3 moles of morpholine and 1.5 liters of dry benzene at about 70° C. for 8 hours. After the reaction is completed, the reaction mixture is filtered and the mother liquor is washed out with water. The benzene phase then is extracted several times with dilute hydrochloric acid, after which the combined hydrochloric acid extracts are made alkaline with sodium hydroxide solution, and the alpha-morpholinopropionyl-ortho-toluidide base thus liberated is taken up in ether to which has been added chloroform. After drying the solution over anhydrous sodium sulphate, the hydrochloride of this base is precipitated by the addition of ethereal hydrogen chloride. The hydrochloride thus precipitated may be purified by recrystallization from ethanol. M.P. 225–227° C. Yield 75%.

By replacing the alpha-bromo-propionyl bromide of Example 1 by the same quantity of beta-bromo-propionyl bromide, there is obtained by its process beta-morpholino-propionyl-ortho-toluidide hydrochloride.

Similarly, by replacing in Example 1 its ortho-toluidine by one mole of mesidine and its alpha-bromo-propionyl bromide by 1.1 moles of alpha-bromo-butyryl bromide, there is produced by its steps alpha-morpholino-butyryl mesidide hydrochloride.

EXAMPLE 2

*Alpha-Morpholinobutyryl-2,6-Xylidide*

One mole of 2,6-xylidine is mixed with 1.5 moles of alpha-bromo-butyric acid. Due to the liberation of heat from the resulting exothermic reaction, a crystalline slurry is formed. The slurry mass is heated on an oil bath at 120 to 140° C. for 3 hours. The product resulting from the reaction is extracted from the reaction mixture by boiling it with water to which has been added some decolorizing animal carbon. After filtering this extraction mixture, from the filtrate alpha-bromobutyryl-2,6-xylidide separates out on cooling. One mole of this bromobutyryl-2,6-xylidide thus obtained is coupled with 3.0 moles of morpholine in 1.5 liters of benzene under heating at 80° C. for 6 hours. Thereafter the benzene solution is cooled and then washed with water; after which the benzene solution is repeatedly extracted with dilute hydrochloric acid. The combined hydrochloric acid extracts is made alkaline with sodium hydroxide solution, and the base thus liberated is dissolved in a mixture of ether and chloroform. After drying the ether-chloroform solution over anhydrous sodium sulphate, the solvent is evaporated off, and the residue, i.e. alpha-morpholino-butyryl-2,6-xylidide, if necessary, may be purified further by recrystallization from benzene. M.P. 182–184° C. Yield 60%.

Instead of heating over an oil-bath the crystalline slurry resulting from the initial mixing of the 2,6-xylidine and the alpha-bromo-butyric acid, 0.25 mole of phosphorus pentoxide can be admixed in it, and that mixture then merely heated on a water-bath for half an hour, and thereafter the process is completed as above.

By replacing the 2,6-xylidine of Example 2 by one mole of mesidine, there is obtained by the same procedure alpha-morpholino-butyryl-mesidide. Similarly, by replacing in Example 2 its 2,6-xylidine by one mole of 6-ethyl-ortho-toluidine, and its alpha-bromo-butyric acid by 1.5 moles of alpha-bromo-propionic acid, and repeating its steps, there is obtained alpha-morpholinopropionyl-6-ethyl-ortho-toluidide.

Likewise, by replacing in Example 2 its 2,6-oxylidine by one mole of ortho-toluidine and its alpha-bromo-butyric acid by 1.5 moles of beta-bromo-butyric acid and repeating the steps of this example, there is obtained beta-morpholinobutyryl-ortho-toluidide. Then, if instead of this beta-bromo-butyric acid there is used 1.5 moles of gamma-bromo-butyric acid with the ortho-toluidine, the procedure of Example 2 yields gamma-morpholino-butyryl-ortho-toluidide.

If only the alpha-bromo-butyric acid of Example 2 is replaced by 1.5 moles of beta-bromo-butyric acid and its steps are repeated, there is obtained beta-morpholino-butyryl-ortho-toluidide.

EXAMPLE 3

*Beta-Morpholinoisobutyrylmesidide*

One mole of ethyl-beta-morpholinoisobutyrate and 1 mole of mesidine are dissolved in 100 ml. of dry benzene, after which one mole of sodium amide is added in portions with stirring. After completing that addition, the reaction mixture is allowed to stand at room temperature for 1 hour, after which time the temperature is increased to reflux boiling and the reaction mixture is heated further at reflux for one hour. After cooling the benzene solution is treated as in Example 2, upon which the base is obtained as colorless crystals. M.P. 167–168° C. Yield 55%.

EXAMPLE 4

(Beta-Morpholino-Iso-Butyryl)-2,6-Xylidide 1 mole of morpholine and 5 grams of sodium are boiled under reflux. After about 1 hour, 1 mole of isobutyryl-2,6-xylidide is added in portions, after the addition of which the reaction mixture is boiled further under reflux for 3 hours. After cooling the reaction mixture, 100 ml. of chloroform are added yielding a chloroform solution which then is washed with water, and the water washing discarded, after which the chloroform solution is extracted several times with dilute hydrochloric acid. The combined hydrochloric acid extracts is made alkaline and the base, thus liberated, is taken up in chloroform. After drying the chloroform phase, the solvent is evaporated off and the base, (beta-morpholino - iso - butyryl) - 2,6-xylidide is obtained as a crystal mass, which may be purified by recrystallization from chloroform.

By separately repeating the steps of Example 4 while replacing its isobutyryl-2,6-xylidide by one mole of isobutyryl-2,6-ortho-toluidide, there is obtained beta-morpholinoisobutyryl-ortho-toluidide.

EXAMPLE 5

Gamma-Morpholinobutyryl-2,6-Xylidide

One mole of 2,6-xylidine hydrochloride and 2 moles of gamma-bromobutyric acid are heated to 100–110° C., after which there is added 0.75 mole of phosphorus trichloride. During the reaction a strong evolution of gas occurs and after some time the mass starts to solidify. It is then heated at 150–160° C. for a short while, and thereafter the reaction mixture after cooling is washed with water and dried. The bromobutyryl-2,6-xylidide so obtained can, if necessary, be recrystallized from glacial acetic acid, toluene, or ethanol.

One mole of that gamma-bromobutyryl-2,6-xylidide is coupled with 3 moles of morpholine in 1.5 liters of benzene under the conditions given in the second paragraph of Example 2 and then further treated as in that example, whereby gamma-morpholinobutyryl - 2,6-xylidide is obtained as colorless crystals from benzene. M.P. 121–122° C. Yield 75%.

The 0.75 mole of phosphorus trichloride used in the early part of Example 5 can be replaced by a like proportion of a similarly effective condensing agent, such as phosphorus pentachloride, phosphorus oxychloride, or thionyl chloride, or the like.

EXAMPLE 6

Beta-Morpholinopropionylmesidide

One mole of mesitylphosphazomesidide is mixed with 2 moles of beta-morpholinopropionic acid hydrochloride, and the mixture is heated at 100–150° C. for 1 hour. After cooling the reaction mixture, it is diluted with water and made alkaline by the addition of sodium hydroxide, and the base, beta-morpholinopropionylmesidide, thus liberated is taken up in ether-chloroform. This solution of the base is extracted several times with dilute hydrochloric acid. The combined acid extracts is made alkaline with sodium hydroxide thereby liberating the beta-morpholinopropionylmesidide. The latter is dissolved in a mixture of ether and chloroform, the resulting solution is dried over anhydrous sodium sulfate, filtered, and the solvent evaporated off leaving the desired base which, if necessary, can be recrystallized from benzene. Yield 82%. M.P. 150–151° C.

EXAMPLE 7

Alpha-Morpholinopropionyl-2,6-Xylidide

To a solution of 1 mole of 2,6-xylidine in 600 ml. of dry benzene there is slowly added a solution of 1 mole of ortho - (p-toluenesulphonyl)-alpha - hydroxypropionyl chloride in 400 ml. of dry benzene. The addition is accompanied by liberation of heat and when this has ceased, the reaction mixture is boiled under reflux for 1 hour. On cooling, the ortho-(para-toluenesulphonyl)-alpha-hydroxypropionyl-2,6-xylidide crystallizes from the filtered solution. Yield 85%.

One mole of the latter toluenesulphonyl compound thus obtained is mixed with a solution of 2.8 moles of morpholine in 500 ml. of dry benzene and is heated in a closed vessel for 8 hours to 80° C. After the reaction is completed, the isolation is carried out by the isolation procedure described in Example 2, yielding the base, alpha-morpholinopropionyl-2,6-xylidide.

EXAMPLE 8

Beta-Morpholinobutyryl-2,6-Xylidide

One mole of 2,6-xylidine and 1 mole of beta-morpholinobutyric acid hydrochloride is dissolved in a mixture of 500 ml. of acetone and 300 ml. of water. Then 1.5 moles of cyclohexyl carbodiimide (i.e. cyclohexyl cyanamide) is added. After a short while at room temperature, a weak evolution of heat occurs and a white precipitate separates from the solution. After 3 hours, the solution is filtered, and the filtrate is evaporated until all of the acetone has been removed. The residual water phase is made alkaline with sodium hydroxide, whereupon the base, beta-morpholinobutyryl-2,6-xylidide, is taken up in ether and is further treated as described in Example 2. Yield 65%.

EXAMPLE 9

Beta-Morpholinopropionyl-Ortho-Toluidide

One mole of N,N'-ditolylthiourea and 1 mole of beta-morpholinopropionic acid hydrochloride are mixed intimately, after which their mixture is heated in an oil bath to 180° C., whereupon evolution of gas starts. After an hour, the melt is allowed to cool and is dissolved in water. The water phase then is made strongly alkaline by the addition of sodium hydroxide, and thereafter is extracted with chloroform. The chloroform solution is dried over anhydrous sodium sulphate, the solvent then is evaporated off, and the residue recrystallized, whereby the beta-morpholinopropionyl-ortho-toluidide is obtained as colorless crystals. M.P. of its hydrochloride 199–201° C. Yield 65%.

The end product hydrochloride of Example 1 is converted to its free base by dissolving that hydrochloride in water and making the resulting aqueous solution alkaline, say, with sodium hydroxide, as is done with the combined hydrochloric acid extracts in Example 2. Then the base of Example 1, thus liberated, likewise is dissolved in a mixture of ether and chloroform, the resulting solution then is dried, for example, over anhydrous sodium sulfate and separated from the drying agent, and the solvent evaporated off. The residue is a crystalline mass of the base, alpha-morpholinopropionyl-ortho-toluidide. If necessary, this base can be recrystallized from a suitable inert solvent e.g. benzene, chloroform or ether, or mixtures of any that are mutually miscible.

The hydrohalide of each of the free bases disclosed herein (whether in a fully detailed example or in abbreviated form following such a detailed example), and of any others embraced by the formula of compound I, is prepared by dissolving the particular specific base in a compatible (i.e. inert) solvent for it and which preferably is not a solvent for its hydrohalide, for example, in ether, chloroform, or benzene, and the like. Dry hydrogen halide gas, for example, hydrogen chloride, is passed into such solution, such as the ether solution of the specific base until sufficient of the gas has passed through to convert the base to its hydrochloride, for example, alpha-morpholinobutyryl-2,6-xylidide hydrochloride, which hydrochloride then separates out. The specific hydrochloride then is separated from the ether, or other solvent for it, by being filtered off, washed with a small amount of the same solvent and dried. Alternatively, the mixture of the solvent containing the hydrochloride that separated out can be evaporated to drive off the solvent.

Instead of the hydrochloride, any other hydrohalide of each of the herein specifically disclosed and other bases embraced by the formula of compound I, for example, its hydrobromide, is similarly prepared by replacing the dry hydrogen chloride in the process outlined in the just preceding paragraph, by hydrogen bromide. Thereby there is obtained the respective hydrobromide or hydrofluoride, such as alpha-morpholinobutyryl-2,6-xylidide hydrobromide or alpha-morpholinobutyryl-2,6-xylidide hydrofluoride.

Alternatively, any other of the therapeutically innocuous acid addition salts, such as any of those named in the second paragraph of this specification, is prepared by mixing a solution of the particular morpholinoacyl toluidide or mesidide within the formula of compound I, in a compatible solvent for it and inert to the particular acid to be used to make the desired salt, for example, in ether, with a solution of the selected acid required for the desired salt in preferably the same solvent or one miscible with it, such as a solution in ether of the respective mineral or organic acid whose acid addition salt is desired and in an amount preferably just stoichiometrically equivalent to, and otherwise perhaps only just slightly in excess of, that required to form such acid addition salt. The resulting salt then is separated from the solvent vehicle in known manner, for example, as illustrated in the second immediately preceding paragraph. Such acids that may be added in ether solution are, for example, glacial acetic acid, fumaric acid, maleic acid, phosphoric acid or tartaric acid, thereby to yield the acetate, fumarate, maleate, phosphate, or tartarate respectively. The selected acid whose acid addition salt is to be prepared can be dissolved in any other suitable, advantageously readily evaporatable solvent for it which is miscible with ether, or with chloroform or benzene, depending on which solvent was used for the free base, and the desired addition salt similarly prepared.

Thus, for example, with nitric acid, sulphuric acid, phosphoric acid, acetic acid, ascorbic acid, citric acid, fumaric acid, glycolic acid, lactic acid, levulinic acid, maleic acid, oxalic acid, succinic acid, tartaric acid, methanesulphonic acid, ethanesulphonic acid, and nicotinic acid, using each of them separately respectively, for example, with each of the bases specifically disclosed herein (whether in a fully detailed example or by abbreviated supplement to any such example), there is obtained separately respectively the corresponding acid addition salt of each such base, each of which such acid addition salt of each such individual base respectively is incorporated herein for brevity by this overall description of their identity by this reference to their separate preparation from each one of these bases separately with one at a time of each one of the applicable acids named herein with the intent that it appear as if each one of them is actually written out separately respectively in full, for example, Alpha-morpholinobutyryl-2,6-xylidide nitrate,
Alpha-morpholinobutyryl-2,6-xylidide sulfate,
Alpha-morpholinobutyryl-2,6-xylidide phosphate,
Alpha-morpholinobutyryl-2,6-xylidide acetate,
Alpha-morpholinobutyryl-2,6-xylidide ascorbate,
Alpha-morpholinobutyryl-2,6-xylidide citrate,
Alpha-morpholinobutyryl-2,6-xylidide fumarate,
Alpha-morpholinobutyryl-2,6-xylidide glycolate,
Alpha-morpholinobutyryl-2,6-xylidide lactate,
Alpha-morpholinobutyryl-2,6-xylidide levulinate,
Alpha-morpholinobutyryl-2,6-xylidide maleate,
Alpha-morpholinobutyryl-2,6-xylidide oxalate,
Alpha-morpholinobutyryl-2,6-xylidide succinate,
Alpha-morpholinobutyryl-2,6-xylidide tartrate,
Alpha-morpholinobutyryl-2,6-xylidide methanesulfonate,
Alpha-morpholinobutyryl-2,6-xylidide ethanesulfonate, and
Alpha-morpholinobutyryl-2,6-xylidide nicotinate, and so on correspondingly respectively for each such above named acid addition salt, as well as the specific hydrohalides also, of each of the other individual morpholinoacyl toluidides, xylidides and mesidides specifically disclosed herein. It should be noted that in case water is present at the step of isolation of the salt water may be included in the product, possibly as crystal water.

The expression "physiologically innocuous" used herein is the recognized equivalent for the expression "therapeutically acceptable" often used to designate a substance which is physiologically innocuous when taken in a dosage and in a regimen (i.e. frequency of administration) that is effective for its indicated therapeutically useful application, and thus is pharmacologically harmless.

Thus, the anion of the acid used to produce such physiologically innocuous acid addition salts as those exemplified hereinabove, often is referred to as a physiologically, or pharmaceutically, acceptable anion, so that the related acid addition salts can be referred to as acid addition salts of the base containing a pharmaceutically acceptable anion.

The term "barbiturate" is used herein generically as explained in the fourth paragraph of this specification. Accordingly, when a barbiturate other than a thiobarbiturate is intended, the term (oxo)barbiturate is used.

The same fourth paragraph hereof explains that the morpholinoacyl toluidides and mesidides of the invention potentiate and enhance the therapeutic activity of other therapeutic agents. Accordingly, the invention also includes (a) pharmaceutical preparations comprising (i) any such general sedative, hypnotic and soporific agents, or general analgesic agents, and (ii) an amount of any one or more of the morpholinoacyl toluidides and mesidides of the invention sufficient to enhance the desired therapeutic activity of the agent (i); and (b) the method of enhancing the therapeutic effectiveness of any of such general sedative, hypnotic, and soporific agents, general anesthetic agents, and analgesic agents, in man and other animals, which method comprises administering also a morpholinoacylamide embraced in the general formula of compound I and/or a physiologically innocuous salt thereof and in an amount sufficient to enhance the activity of such agent or to give the desired enhancement of its activity.

The preparations of this part of the invention can be put up in any of the same dosage forms as those in which the particular general sedative, hypnotic or soporific agent, or general analgesic agent, ingredient ordinarily is formulated. Thus, for example, the preparations of the invention, the ingredients of which comprise one or more of each of both types (i) and (ii) of the substances and agents referred to in the preceding paragraph, can be compounded (1) in solid dosage forms such as tablets, capsules, or powder mixes, or (2) in liquid dosage forms such as solutions, elixirs, or suspensions.

Wide variation is possible in the proportion of the morpholinoacylamide ingredient included. This is so because there will be some potentiation by whatever amount of the morpholinoacylamide ingredient is included. Thus, the proportion to use will depend on the particular sedative, hypnotic and soporific agent or general analgesic agent included and on its therapeutic index and duration of effectiveness.

Likewise, the same considerations apply in the method of potentiating the activity of the sedative, hypnotic and soporific agents, and of the general analgesic agents, and of the general anesthetic agents as well.

With the general anesthetic agents, this method of potentiation is generally more applicable to them because of their usual use by administration in gaseous or vapor form.

These preparations of the invention are particularly advantageous with the barbiturates especially because of the low therapeutic index characteristic of many of them. Thus, such preparations can be illustrated by, but not restricted to, a tablet containing from about one to about three parts of the particular barbiturate to one part of the selected morpholinoacylamide of the invention or physiologically innocuous salt thereof, together with the usual diluents and binders and lubricants ordinarily included in such barbiturate tablets. More specifically, such a tablet can contain, for example, three parts of thiopental to two parts of alpha-morpholinobutyryl-2,6-xylidide, and the usual diluent, binder and lubricant.

For the solid dosage forms, it is generally preferable to use one or more of the physiologically innocuous salts of any of the particular morpholinoacylamides of the invention to be included. Such salts also would be generally preferred for the aqueous dosage forms. However, the particular one or more morpholinoacylamide (i.e. base form) can be used more generally in some of the elixir or suspension forms. Obviously, the liquid dosage form includes also the injectable form whether the morpholinoacylamide of the invention is to be administered alone or jointly with another agent whose activity is to be potentiated.

While the invention has been explained by detailed description of certain specific embodiments of it, it is understood that various modifications and substitutions can be made in any of these embodiments or others, within the scope of the appended claims which are intended to cover also equivalents of these specific embodiments.

What is claimed is:

1. A member of the class consisting of (*a*) an amide having the formula

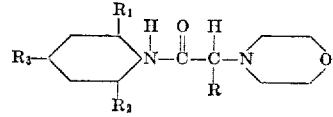

wherein each of R and $R_1$ is a member of the class consisting of methyl and ethyl; each of $R_2$ and $R_3$ is a member of the class consisting of hydrogen and methyl; and (*b*) a pharmaceutically acceptable acid addition salt of said amide (*a*).

2. Morpholinobutyryl-2,6-xylidide.
3. Alpha-morpholinobutyryl-2,6-xylidide.
4. A pharmaceutically acceptable acid addition salt of morpholinobutyryl-2,6-xylidide.
5. A pharmaceutically acceptable acid addition salt of alpha-morpholinobutyryl-2,6-xylidide.

References Cited in the file of this patent

UNITED STATES PATENTS

| | | |
|---|---|---|
| 1,830,313 | Crossley | Nov. 3, 1931 |
| 1,928,346 | Axilrod | Sept. 26, 1933 |
| 2,575,041 | Bauer | Nov. 13, 1951 |
| 2,704,284 | Weston | Mar. 15, 1955 |
| 2,823,209 | Martin | Feb. 11, 1958 |
| 2,912,460 | Ehrhart et al. | Nov. 10, 1959 |

FOREIGN PATENTS

| | | |
|---|---|---|
| 634,072 | Great Britain | Mar. 15, 1950 |
| 634,073 | Great Britain | Mar. 15, 1950 |
| 726,864 | Great Britain | Mar. 23, 1955 |

UNITED STATES PATENT OFFICE

CERTIFICATE OF CORRECTION

Patent No. 3,108,997                       October 29, 1963

Johan Richard Dahlbom et al.

It is hereby certified that error appears in the above numbered patent requiring correction and that the said Letters Patent should read as corrected below.

Column 1, line 55, for "transquilizing" read -- tranquilizing --; column 2, line 35, for "and" read -- to --; column 4, line 55, for "oxylidine" read -- xylidine --; line 67, for "ortho-toluidide" read -- 2,6-xylidide --; column 6, line 25, for "500" read -- 5000 --; column 7, line 42, for "tartarate" read -- tartrate --; column 8, lines 21 and 22, for "thereapeutically" read -- therapeutically --.

Signed and sealed this 4th day of May 1965.

(SEAL)
Attest:

ERNEST W. SWIDER                       EDWARD J. BRENNER
Attesting Officer                          Commissioner of Patents